(12) United States Patent
Tasaki et al.

(10) Patent No.: US 11,808,188 B2
(45) Date of Patent: Nov. 7, 2023

(54) PARTICULATE FILTER

(71) Applicant: Cataler Corporation, Kakegawa (JP)

(72) Inventors: Ryo Tasaki, Kakegawa (JP); Ryota Onoe, Kakegawa (JP); Momoko Iwai, Kakegawa (JP); Yamato Matsushita, Kakegawa (JP)

(73) Assignee: Cataler Corporation, Kakegawa (JP)

(*) Notice: Subject to any disclaimer, the term of this patent is extended or adjusted under 35 U.S.C. 154(b) by 0 days.

(21) Appl. No.: 17/618,082

(22) PCT Filed: Jun. 26, 2020

(86) PCT No.: PCT/JP2020/025265
§ 371 (c)(1),
(2) Date: Dec. 10, 2021

(87) PCT Pub. No.: WO2020/262623
PCT Pub. Date: Dec. 30, 2020

(65) Prior Publication Data
US 2022/0316372 A1    Oct. 6, 2022

(30) Foreign Application Priority Data

Jun. 26, 2019 (JP) .................. 2019-119019

(51) Int. Cl.
*F01N 3/022* (2006.01)
*B01D 46/82* (2022.01)
(Continued)

(52) U.S. Cl.
CPC ......... *F01N 3/022* (2013.01); *B01D 46/2474* (2013.01); *B01D 46/82* (2022.01);
(Continued)

(58) Field of Classification Search
CPC .................................................. Y02T 10/12
See application file for complete search history.

(56) References Cited

U.S. PATENT DOCUMENTS 7,871,452 B2 * 1/2011 Yamada ................. B01J 37/024
                                                    422/177
8,758,695 B2 * 6/2014 Neubauer ............ B01J 37/0248
                                                    422/177
(Continued)

FOREIGN PATENT DOCUMENTS

DE      202017007047 U1    4/2019
JP         2005009454 A    1/2005
(Continued)

OTHER PUBLICATIONS

Indian Office Action, dated May 10, 2023 (3 pages).
(Continued)

*Primary Examiner* — Binh Q Tran
(74) *Attorney, Agent, or Firm* — Occhiuti & Rohlicek LLP (57) ABSTRACT

A particulate filter disclosed herein includes a wall-flow structure substrate 10 and a wash coat layer 20 held inside a partition 16 of the substrate 10. The wash coat layer 20 includes an inlet layer 22 formed to have predetermined length $L_A$ and thickness $T_A$ from near an end thereof on an exhaust gas inflow side X1, and an outlet layer 24 formed to have predetermined length $L_B$ and thickness $T_B$ from near an end thereof on an exhaust gas outflow side X2. The inlet layer 22 and the outlet layer 24 partially overlap each other. In the particulate filter disclosed herein, the inlet layer 22 contains a precious metal catalyst, while the outlet layer 24 contains substantially no precious metal catalyst. The length $L_A$ of the inlet layer is 50% or more and 75% or less of a total length L of the partition 16. Thus, the particulate filter is capable of achieving both PM collection performance and pressure-drop reduction performance at high levels.

19 Claims, 3 Drawing Sheets

(51) Int. Cl.
    *B01D 46/24*      (2006.01)
    *B01D 53/94*      (2006.01)
    *B01J 21/04*      (2006.01)
    *B01J 23/02*      (2006.01)
    *B01J 23/58*      (2006.01)
    *B01J 35/00*      (2006.01)
    *B01J 35/04*      (2006.01)
    *F01N 3/035*      (2006.01)
    *F01N 3/023*      (2006.01)
    *F01N 9/00*      (2006.01)
    *F01N 3/021*      (2006.01)
    *F01N 3/025*      (2006.01)
    *F01N 3/28*      (2006.01)

(52) U.S. Cl.
CPC .............. *B01D 53/94* (2013.01); *B01J 21/04* (2013.01); *B01J 23/02* (2013.01); *B01J 23/58* (2013.01); *B01J 35/0006* (2013.01); *B01J 35/04* (2013.01); *F01N 3/035* (2013.01); *B01D 2255/1023* (2013.01); *B01D 2255/9022* (2013.01); *B01D 2255/9155* (2013.01); *B01D 2279/30* (2013.01); *F01N 3/021* (2013.01); *F01N 3/023* (2013.01); *F01N 3/0253* (2013.01); *F01N 3/2882* (2013.01); *F01N 9/002* (2013.01); *F01N 2250/02* (2013.01); *F01N 2330/06* (2013.01); *F01N 2370/24* (2013.01); *F01N 2510/063* (2013.01); *F01N 2510/0682* (2013.01); *F01N 2510/0684* (2013.01)

(56) References Cited

U.S. PATENT DOCUMENTS

| | | | | |
|---|---|---|---|---|
| 10,557,390 | B2* | 2/2020 | Yoshioka | ................ B01J 23/42 |
| 11,266,982 | B2* | 3/2022 | Kurihara | ................ B01J 21/066 |
| 2009/0229259 | A1 | 9/2009 | Mizutani | |
| 2011/0047992 | A1 | 3/2011 | Adelman et al. | |
| 2016/0279571 | A1* | 9/2016 | Tsuji | ....................... F01N 3/035 |
| 2016/0281562 | A1 | 9/2016 | Miyairi et al. | |
| 2017/0306823 | A1 | 10/2017 | Onoe et al. | |
| 2018/0133648 | A1 | 5/2018 | Sekine et al. | |
| 2019/0120104 | A1* | 4/2019 | Inoda | ................... F01N 3/2892 |
| 2019/0168161 | A1* | 6/2019 | Cravillon | ............. B01J 37/0244 |
| 2019/0193057 | A1 | 6/2019 | Hoshino et al. | |
| 2020/0263587 | A1 | 8/2020 | Nomura et al. | |
| 2020/0276568 | A1* | 9/2020 | Makino | ............... B01J 37/0248 |

FOREIGN PATENT DOCUMENTS

| | | |
|---|---|---|
| JP | 2009220029 A | 10/2009 |
| JP | 2011047405 A | 3/2011 |
| JP | 2012036821 A | 2/2012 |
| JP | 5689685 B2 | 3/2015 |
| JP | 2016182536 A | 10/2016 |
| JP | 2018051442 A | 4/2018 |
| JP | 2018515328 A | 6/2018 |
| JP | 2019063700 A | 4/2019 |
| WO | 2009100097 A2 | 8/2009 |
| WO | 2016060048 A1 | 4/2016 |
| WO | 2016160953 A1 | 10/2016 |
| WO | 2017163984 A1 | 9/2017 |
| WO | 2018123286 A1 | 7/2018 |

OTHER PUBLICATIONS

English Translation of International Preliminary Report on Patentability in PCT/JP2020/025265 (6 pages).

Indian Office Action in IN Application No. 202227001466 (5 pages).

Extended European Search Report in EP Application No. 20833399.7 (7 pages).

* cited by examiner

PARTICULATE FILTER

CROSS REFERENCE TO RELATED APPLICATIONS

This application is a 371 application of International Application no. PCT/JP2020/025265, filed Jun. 26, 2020, which claims priority to Japanese Patent Application no. 2019-119019, filed Jun. 26, 2019, the contents of which are incorporated herein by reference.

TECHNICAL FIELD

The present invention relates to particulate filters. More particularly, the present invention relates to a particulate filter that collects particulate matter (PM) contained in exhaust gas emitted from an internal combustion engine.

This application claims priority from Japanese Patent Application No. 2019-119019 filed on Jun. 26, 2019, the entire contents of which are incorporated herein by reference.

BACKGROUND ART

Exhaust gas from an internal combustion engine using gasoline or diesel oil as a fuel contains gas components, for example, hydrocarbon (HC), carbon monoxide (CO), and nitrogen oxide ($NO_x$) and also contains particulate matter (hereinafter also referred to as "PM") that mainly contains carbon. The emissions of PM are set while considering influences on the human body, as with the emissions of gas components such as HC, CO, and $NO_x$.

An example of a technique of removing the PM from exhaust gas is arrangement of a particulate filter (hereinafter, also simply referred to as a "filter") that collects the PM in an exhaust passage of the internal combustion engine. The particulate filter is, for example, a wall-flow filter. The wall-flow filter includes a honeycomb structure substrate having a plurality of hollow portions (cells) as a base and is configured by alternately forming inlet cells with blocked outlets and outlet cells with blocked inlets. Exhaust gas that has been supplied to the wall-flow filter flows into the inlet cells, passes through a porous partition, and is then discharged to outside of the filter through the outlet cells. At this time, PM in the exhaust gas is collected in fine pores of the partition. The wall-flow filter may be provided with a wash coat layer formed inside the partition (on the wall of the fine pores) in order to improve high temperature stability, PM collection performance, and the like.

In this type of wall-flow filter, as the amount of deposited PM in the fine pores of the partition increases, gas flowability may be lowered because of clogging of the fine pores, resulting in an increase in pressure loss (hereinafter also referred to as "pressure drop"). Therefore, in a recent particulate filter, a precious metal catalyst that promotes oxidation (combustion) of PM deposited in the fine pores is supported by the wash coat layer. Patent Literatures 1 to 3 disclose examples of the particulate filter with the precious metal catalyst supported therein.

CITATION LIST

Patent Literature

Patent Literature 1: Japanese Patent Application Publication No. 2009-220029

Patent Literature 2: Japanese Patent Application Publication No. 2016-182536

Patent Literature 3: Japanese Patent Publication No. 5689685

SUMMARY OF INVENTION

Technical Problem

In recent years, regulations on the PM emissions have been tightened, and therefore a particulate filter that exhibits more excellent PM collection performance than a conventional one has been demanded. The inventors have made studies to meet the demand and have found that, in a wall-flow filter, PM is collected in fine pores with smaller diameters preferentially and the diameter of fine pores in a partition is reduced as the amount of deposited PM increases. From these findings, the inventors have considered that the PM collection performance of the wall-flow filter is improved in association with an increase in the amount of deposited PM by continuous use.

However, as described above, the increase in the amount of deposited PM in the fine pores may cause an increase in the pressure drop due to reduction of the gas flowability, and therefore a recent particulate filter is designed to support a precious metal catalyst for promoting combustion of PM, in a wash coat layer. In the particulate filter having this structure, it is difficult to benefit from the improvement in PM collection performance in association with the increase in the amount of deposited PM. It has been thus found that the wall-flow filter has difficulty in achieving both PM collection performance and pressure-drop reduction performance at high levels.

Solution to Problem

The present invention has been made in view of the above circumstances, and its main object is to provide a particulate filter capable of achieving both PM collection performance and pressure-drop reduction performance at high levels.

Solution to Problem

The inventors have focused on the following points in studies for solving the above-described problems.

Exhaust gas emitted from an internal combustion engine has a tendency that the content of PM is high especially in exhaust gas at an early stage of operation, which is immediately after the start of the operation of the internal combustion engine, and also in exhaust gas during a high load operation after the internal combustion engine has been revved up. The exhaust gas at the early stage of operation has a low flow rate and thus tends to pass through a partition on the upstream side in the gas flow direction. The exhaust gas during the high load operation has a relatively high flow rate and thus tends to pass through a partition on the downstream side.

As described above, the inventors have thought that both PM collection performance and pressure-drop reduction performance can be achieved at high levels if it is possible to design a filter configured to suitably purify the exhaust gas at the early stage of operation and during a high load operation without deteriorating the pressure-drop reduction performance. The inventors then have conducted various studies and have reached the idea of having a precious metal catalyst present in an upstream region of the partition but not present in a downstream region of the partition, and adjusting the length of the upstream region of the partition with respect to the total length of the partition to be within a predetermined range.

Specifically, when the precious metal catalyst is made present in the upstream region of the partition, the recovery of gas flowability by combustion of PM can easily occur, but the improvement in the PM collection performance by deposition of PM is less likely to occur in the upstream region. However, at the early stage of operation, warm-up of the particulate filter has not been completed and therefore the combustion of PM is less likely to occur even if the precious metal catalyst is present in the upstream region. Accordingly, while the exhaust gas at the early stage of operation is supplied, PM can be easily deposited also in the upstream region, and the filter can exhibit high PM collection performance. Meanwhile, exhaust gas having a low PM content and a high flow rate is supplied at and after a middle stage of operation. At this time, the temperature of the particulate filter has risen sufficiently, and the recovery of the gas flowability by the combustion of PM suitably occurs in the upstream region, thereby making it possible to suppress a large increase in the pressure drop.

In addition, by not having the precious metal catalyst present in the downstream region of the partition, the improvement in the PM collection performance by an increase in the amount of deposited PM easily occurs in the downstream region. Accordingly, the PM collection performance in the downstream region can be improved in advance before a high load operation is performed, thus enabling suitable PM collection during the high load operation. Meanwhile, when no precious metal catalyst is present in the downstream region, PM may be deposited in that region, resulting in a degraded pressure-drop reduction performance (gas flowability). However, the exhaust gas during the high load operation has a relatively high temperature, so that PM can be burned little by little even if no precious metal catalyst is present. Accordingly, even in the case where no precious metal catalyst is present in the downstream region of the partition, a rapid increase in the pressure drop is less likely to occur.

A particulate filter disclosed herein has been made on the basis of the above-described findings. The particulate filter is suitable for collecting particulate matter in exhaust gas emitted from an internal combustion engine. The particulate filter is disposed in an exhaust passage of the internal combustion engine. The particulate filter includes: a wall-flow structure substrate including an inlet cell open only at an exhaust gas inflow end, an outlet cell adjacent to the inlet cell and open only at an exhaust gas outflow end, and a porous partition that partitions the inlet cell and the outlet cell; and a wash coat layer formed inside the partition. The wash coat layer includes: an inlet layer having a predetermined thickness from a surface of the partition in contact with the inlet cell toward an inner side of the partition and having a predetermined length along an extending direction of the partition from near the exhaust gas inflow end; and an outlet layer having a predetermined thickness from a surface of the partition in contact with the outlet cell toward the inner side of the partition and having a predetermined length along the extending direction of the partition from near the exhaust gas outflow end. The thicknesses and the lengths of the inlet layer and the outlet layer are set such that the inlet layer and the outlet layer partially overlap each other. In the particulate filter disclosed herein, the inlet layer contains a precious metal catalyst that promotes combustion of particulate matter, while the outlet layer contains substantially no precious metal catalyst. In addition, assuming that the total length of the partition in the extending direction is 100%, the inlet layer exists in a region of 50% or more and 75% or less from near the exhaust gas outflow end.

In the particulate filter disclosed herein, the precious metal catalyst present in an inlet region prevents clogging of fine pores at an early stage of operation in which a lot of PM is supplied, thus enabling the gas flowability in the inlet region to be maintained at a higher level. In addition, the length of the inlet layer (the length of the inlet region) with respect to the total length of the partition is set to be 50% or more and 75% or less to ensure the inlet region sufficiently. Thus, the PM collection performance in this region can be ensured sufficiently. Further, in the particulate filter disclosed herein, since no precious metal catalyst is present in an outlet region, the PM collection performance in the outlet region can be improved sufficiently before a high load operation is performed. Furthermore, high-temperature exhaust gas during the high load operation is likely to be supplied to the outlet region, thus making it possible to burn PM even without a precious metal catalyst and to ensure sufficient gas flowability.

It is noted that a region where the inlet layer is formed and the precious metal catalyst is present is hereinafter referred to as the "inlet region" for convenience of description. A region where only the outlet layer is formed and which contains substantially no precious metal catalyst is referred to as the "outlet region". In the particulate filter disclosed herein, the inlet layer and the outlet layer partially overlap with each other in order to avoid formation of a region where no wash coat layer is formed. The region where the inlet layer and the outlet layer partially overlap each other is regarded as the "inlet region" because the precious metal catalyst is present.

In a preferred embodiment of the particulate filter disclosed herein, assuming that the total length of the partition in the extending direction is 100%, the inlet layer exists in a region of 60% or more from near the exhaust gas outflow end. Thus, more suitable pressure-drop reduction performance can be obtained.

In a preferred embodiment of the particulate filter disclosed herein, a content of the precious metal catalyst in the inlet layer is 0.1 g/L or more. Thus, the gas flowability in the inlet region can be maintained at a higher level.

In a preferred embodiment of the particulate filter disclosed herein, assuming that a thickness of the partition is 100%, the inlet layer has a thickness of 60% or more and 100% or less from the surface in contact with the inlet cell toward the inner side of the partition. Thus, more suitable PM collection performance can be obtained while sufficiently ensuring the volume of the inlet layer.

In a preferred embodiment of the particulate filter disclosed herein, assuming that the thickness of the partition is 100%, the outlet layer is formed has a thickness of 60% or more and 100% or less from the surface in contact with the outlet cell toward the inner side of the partition. Thus, the PM collection performance in the outlet region can be further improved.

In a preferred embodiment of the particulate filter disclosed herein, the precious metal catalyst contains at least one platinum group element selected from a group consisting of Pt, Pd, and Rh. These platinum group elements are excellent in the action of promoting the combustion of PM, thus making it possible to enhance the gas flowability in the inlet region.

In a preferred embodiment of the particulate filter disclosed herein, the internal combustion engine is a gasoline engine. Exhaust gas from the gasoline engine has a relatively high temperature, and PM is likely to be burned. Therefore, the exhaust gas from the gasoline engine has a tendency that the improvement in PM collection performance in association with deposition of PM is less likely to occur. The particulate filter disclosed herein allows PM to be appropriately deposited in the inlet region, even when being disposed in an exhaust passage of the gasoline engine. Therefore, the particulate filter can be suitably used, especially as a gasoline particulate filter (GPF).

DESCRIPTION OF EMBODIMENTS

Preferred embodiments of the present invention will be described below with reference to the drawings. Matters other than those particularly mentioned herein and necessary to carry out the present invention (e.g., general matters concerning the location of a particulate filter in an exhaust passage) are recognizable as matters to be designed by a person skilled in the art on the basis of technologies known in this field. The present invention can be carried out on the basis of the description disclosed herein and common technical knowledge in this field. As used herein, the term "A to B" indicating a range of values means "A or more and B or less".

A. Overall Configuration

Figure 1:
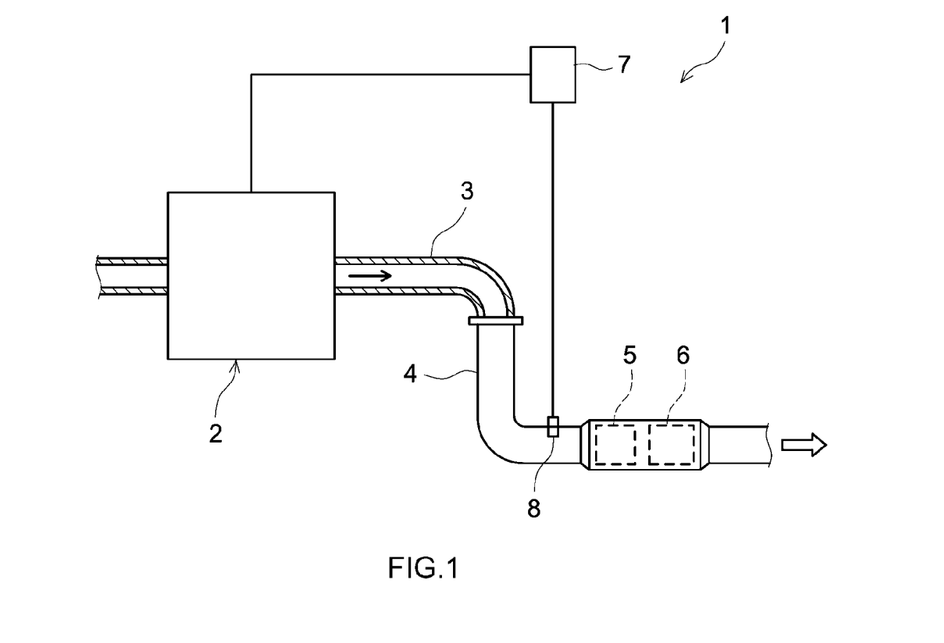
FIG. 1 is a diagram schematically illustrating an exhaust system in which a particulate filter according to an embodiment is disposed.

First, the overall configuration of an exhaust gas purification device will be described which uses a particulate filter according to the present embodiment. FIG. 1 schematically illustrates an exhaust system in which the particulate filter according to the present embodiment is disposed. In the exhaust system illustrated in FIG. 1, an exhaust gas purification device 1 is provided in an exhaust passage of an internal combustion engine 2.

An air-fuel mixture containing oxygen and fuel gas is supplied to the internal combustion engine 2. The internal combustion engine 2 converts thermal energy in combustion of the air-fuel mixture to kinetic energy. Exhaust gas generated by combustion of the air-fuel mixture is discharged to the exhaust passage configured by an exhaust manifold 3 and an exhaust pipe 4 as illustrated with an arrow in FIG. 1. The side in the flow direction of exhaust gas closer to the internal combustion engine 2 is described herein as the upstream side, and the side far from the internal combustion engine 2 is described herein as the downstream side for convenience of description.

The exhaust gas purification device 1 purifies the exhaust gas discharged to the exhaust passage. The exhaust gas purification device 1 includes an engine control unit (ECU) 7 and a sensor 8. The sensor 8 detects information regarding components of the exhaust gas and the temperature of the exhaust gas. The ECU 7 receives the result of detection by the sensor 8 as one of multiple pieces of information for controlling an operation of the internal combustion engine 2. The exhaust gas purification device 1 illustrated in FIG. 1 further includes a catalyst section 5 and a filter section 6.

The catalyst section 5 is provided in the exhaust pipe 4. An exhaust gas purifying catalyst that purifies ternary components of exhaust gas, i.e., $NO_x$, HC, and CO, can be used in the catalyst section 5. The specific structure of the exhaust gas purifying catalyst used in the catalyst section 5 does not characterize the present invention, and a detailed description thereof is thus omitted. Although the catalyst section 5 is disposed on the upstream side of the filter section 6 in the exhaust gas purification device 1 illustrated in FIG. 1, the location of the catalyst section is not specifically limited. For example, the catalyst section may be disposed on the downstream side of the filter section. Alternatively, each of catalyst sections in a pair may be provided on the upstream and downstream sides of the filter section.

The filter section 6 collects particulate matter (PM) in the exhaust gas to purify the exhaust gas. The particulate filter according to the present embodiment can be used in the filter section 6 of the exhaust gas purification device 1. In other words, the particulate filter according to the present embodiment is disposed in the exhaust passage (the exhaust pipe 4) of the internal combustion engine 2 as one constituent element of the exhaust gas purification device 1.

B. Particulate Filter

Figure 2:
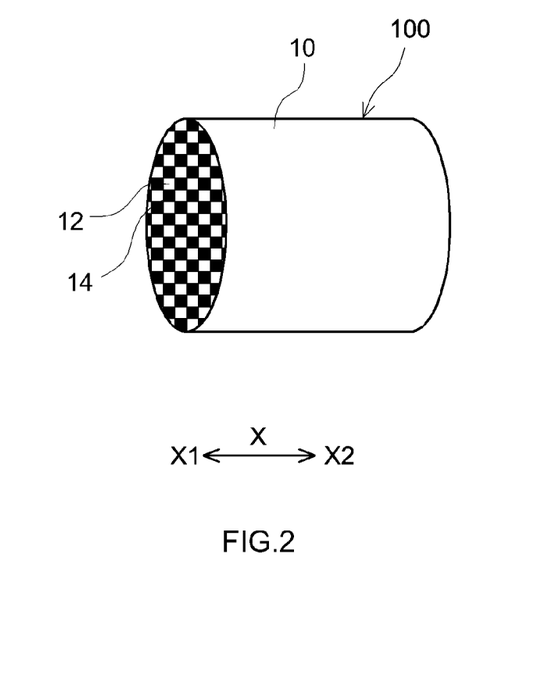
FIG. 2 is a perspective view schematically illustrating the particulate filter according to the embodiment.
Figure 3:
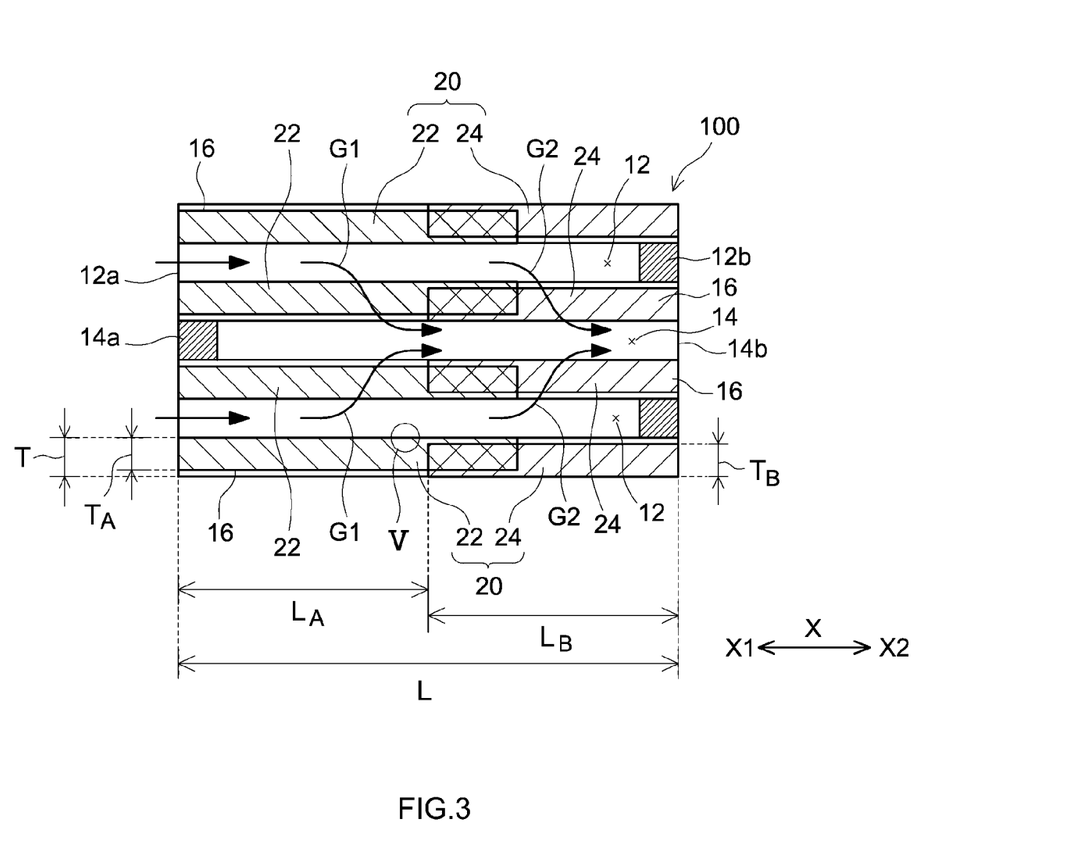
FIG. 3 is a diagram schematically illustrating a cross-section of the particulate filter according to the embodiment, taken along an extending direction thereof.
Figure 4:
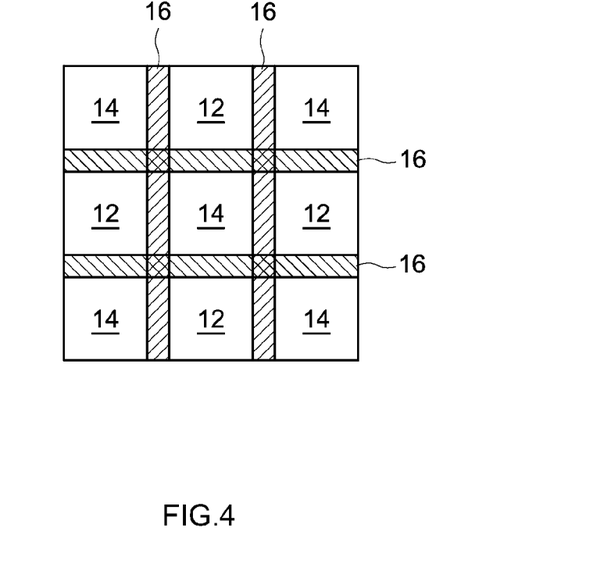
FIG. 4 is a diagram schematically illustrating a cross-section of the particulate filter according to the embodiment, taken along a radial direction thereof.
Figure 5:
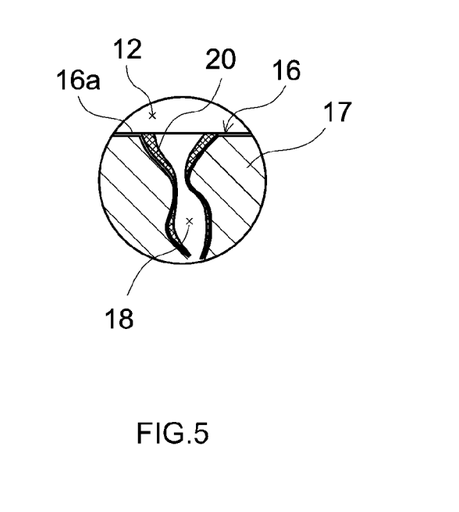
FIG. 5 is a schematic enlarged cross-sectional view of a region V in FIG. 3.

The particulate filter according to the present embodiment will be described below, referring to FIGS. 2 to 5. Reference sign X in FIGS. 2 and 3 indicates "a flow direction of exhaust gas". Reference sign X1 indicates "the exhaust gas inflow side (the upstream side)". Reference sign X2 indicates "the exhaust gas outflow side (the downstream side)". FIG. 2 is a perspective view schematically illustrating the particulate filter according to the present embodiment. FIG. 3 schematically illustrates a cross-section of the particulate filter illustrated in FIG. 2, taken along an extending direction thereof (the flow direction X of exhaust gas). FIG. 4 schematically illustrates a cross-section of the particulate filter, taken along a radial direction thereof (a direction perpendicular to the flow direction X of exhaust gas). FIG. 5 is a schematic enlarged cross-sectional view of a region V in FIG. 3.

As illustrated in FIGS. 2 to 5, a particulate filter 100 according to the present embodiment includes a wall-flow structure substrate 10 and a wash coat layer 20 formed inside a partition 16 of the substrate 10. Each of the constituent elements will be described below.

1. Substrate

As illustrated in FIG. 2, the particulate filter 100 according to the present embodiment uses the cylindrical substrate 10 extending along in the flow direction X of exhaust gas. The substrate 10 has a wall-flow structure as described above. Specifically, the substrate 10 has a honeycomb structure having a plurality of hollow portions (cells 12 and 14). The cells 12 and 14 extend along the flow direction X of exhaust gas. The cells 12 and 14 of the substrate 10 according to the present embodiment are formed by inlet cells 12 and outlet cells 14 adjacent to the inlet cells 12, as illustrated in FIGS. 3 and 4. The inlet cells 12 and the outlet cells 14 are partitioned by the porous partition 16. Various materials that can be conventionally used for this type of purpose are usable for the substrate 10 without any limitation. Examples of the material for the substrate 10 include ceramic, such as cordierite or silicon carbide (SiC), and an alloy (e.g., stainless steel). The outer shape of the substrate is not specifically limited and may be, for example, an elliptical cylinder or a polygonal prism, although the cylindrical substrate 10 is used in the present embodiment.

Among the cells 12 and 14 formed inside the substrate 10, the inlet cells 12 are cells open only at an end on the exhaust gas inflow side X1 (see FIG. 3). That is, in each inlet cell 12, the end on the exhaust gas inflow side X1 is open to the outside of the filter as a gas inlet 12a, and an end on the exhaust gas outflow side X2 is sealed with a sealing section 12b. The outlet cells 14 are cells open only at the end on the exhaust gas outflow side X2. That is, in each outlet cell 14, the end on the exhaust gas inflow side X1 is sealed with a sealing section 14a, and the end on the exhaust gas outflow side X2 is open to the outside of the filter as a gas outlet 14b.

The shapes and sizes of the inlet cells 12 and the outlet cells 14 can be changed as appropriate, in consideration of the flow rate of exhaust gas supplied to the particulate filer 100 and the components of the exhaust gas. For example, the cross-sectional shape of the cells 12 and 14 in a cross-section perpendicular to the extending direction X of the substrate 10 (a cross-section along the radial direction of the substrate 10) is a square in the present embodiment as illustrated in FIG. 4. The cross-sectional area of each inlet cell 12 and that of each outlet cell 14 may be almost the same as each other or different from each other in consideration of the flow rate of exhaust gas. The cross-sectional shape of the cells 12 and 14 is not limited to a square as in the present embodiment. Commonly used shapes, for example, a parallelogram, a rectangle, a trapezoid, a triangle, a pentagon, and a circle can be adopted without any particular limitation.

The substrate 10 is formed such that the inlet cell 12 and the outlet cell 14 are adjacent to each other as illustrated in FIGS. 2 and 4. The substrate 10 according to the present embodiment is formed such that the inlet cells 12 and the outlet cells 14 both having a square cross-sectional shape are disposed in a checkered pattern.

The inlet cell 12 and the outlet cell 14 are partitioned by the corresponding partition 16, as described above. In the present embodiment, each of the partitions 16 formed in a lattice extends along the flow direction X of exhaust gas, and spaces surrounded by the partitions 16 form the cells 12 and 14 (see FIGS. 3 and 4). The partition 16 is porous and has a plurality of fine pores. Specifically, a wall body 17 of the partition 16 is provided with a plurality of fine pores 18 illustrated in FIG. 5. The inlet cells and the outlet cells communicate with each other through a part of the fine pores 18. Thus, exhaust gas having flowed into the inlet cells 12 is allowed to pass through the partition 16 and flow out to the outlet cells 14, as illustrated with arrows in FIG. 3. A thickness T and a total length L of the partition 16 are preferably adjusted from the viewpoint of achieving both PM collection performance and pressure-drop reduction performance. For example, the thickness T of the partition 16 is preferably about 0.2 mm to about 1.6 mm. The total length L of the partition 16 is preferably about 50 mm to about 500 mm and is more preferably 100 mm to 200 mm.

The porosity of the partition 16 is preferably 40% or more, more preferably 45% or more, further preferably 50% or more, and particularly preferably 55% or more from the viewpoint of reducing an increase in the pressure drop. Meanwhile, the upper limit of the porosity of the partition 16 is preferably 80% or less, more preferably 75% or less, further preferably 70% or less, and particularly preferably 65% or less from the viewpoint of maintaining the mechanical strength of the substrate 10. The "porosity of the partition" as used herein refers to a ratio of the volume of the fine pores 18 to the total volume of the partition 16 of the substrate 10 (i.e., the total volume of the wall body 17 and the fine pores 18) and is a value measured by a mercury intrusion technique.

The average pore diameter of the fine pores 18 is preferably 1 μm or more, more preferably 5 μm or more, further preferably 7 μm or more, and particularly preferably 10 μm or more from the viewpoint of improving the pressure-drop reduction performance. Meanwhile, the upper limit of the average pore diameter of the fine pores 18 is preferably 50 μm or less, more preferably 40 μm or less, further preferably 30 μm or less, and particularly preferably 25 μm or less from the viewpoint of improving the PM collection performance. The "average pore diameter of the fine pores 18" as used herein refers to a mean of pore distribution obtained by the mercury intrusion technique.

2. Wash Coat Layer

As illustrated in FIG. 3, the wash coat layer 20 is a coating layer formed inside the partition 16 of the substrate 10. Specifically, the wash coat layer 20 is a porous heat-resistant layer formed on the walls of the fine pores 18 (a surface of the wall body 17 in contact with the fine pores 18) as illustrated in FIG. 5. The wash coat layer 20 can have a function of improving high temperature stability and water absorbency, for example. The wash coat layer 20 can also contribute to improvement in the PM collection performance by an increase in the surface area and/or a size reduction of the fine pores 18. Conventionally known materials can be used for the wash coat layer 20 in the present embodiment without any limitation. Typically, the wash coat layer 20 is mainly made of a heat-resistant material. Typically, the wash coat layer 20 preferably contains 50 mass % or more of heat-resistant material and more preferably 85 mass % or more. A refractory specified in JIS R2001 can be used as the heat-resistant material. Examples of the refractory include neutral refractories, such as alumina ($Al_2O_3$), acid refractories, such as silica ($SiO_2$) and zirconia ($ZrO_2$), and basic refractories, such as magnesia (MgO) and calcia (CaO). Alumina (preferably, activated alumina) is preferable among these refractories. The heat-resistant material for the wash coat layer 20 may be formed of only one of the above-described refractories or a mixture (or a complex) of two or more of the above-described refractories. Examples of the complex are ceria-zirconia composite oxides. The wash coat layer 20 may contain another material (typically inorganic oxide) as a secondary component. Examples of the secondary component include rare earth metal oxides, such as yttria ($Y_2O_3$), and alkaline earth metal oxides, such as barium oxide (BaO).

It is preferable that the wash coat layer 20 is substantially not present on a surface 16a of the partition 16 in contact with the cells 12 and 14 (see FIG. 5) from the viewpoint of surely reducing a rapid increase in the pressure drop caused by blockage of the cells 12 and 14 with the wash coat layer 20. The wording "the wash coat layer is substantially not present on the surface of the partition" means that, assuming that the total coating amount of the wash coat layer 20 is 100%, the amount of coating of the wash coat layer 20 inside the fine pores 18 of the partition 16 is 90% or more, and more preferably 95% or more.

As illustrated in FIG. 3, the wash coat layer 20 in the present embodiment includes an inlet layer 22 and an outlet layer 24. The thicknesses and lengths of the inlet layer 22 and the outlet layer 24 are set such that the inlet layer 22 and the outlet layer 24 partially overlap each other. Each layer will be described below.

(1) Inlet Layer

The inlet layer 22 is a wash coat layer formed in a region near the gas inlet 12a including the partition 16. Specifically, the inlet layer 22 is formed to have a predetermined thickness from a surface of the partition 16 in contact with the inlet cells 12 toward the inner side of the partition 16 and to have a predetermined length along the extending direction of the partition 16 (the flow direction X of exhaust gas) from near the end on the exhaust gas inflow side X1. A thickness $T_A$ of the inlet layer 22 is not specifically limited and may be 50% or more of the thickness T of the partition 16. The thickness $T_A$ of the inlet layer 22 is preferably set to 60% or more, more preferably 70% or more, and further preferably 80% or more of the thickness T from the viewpoint of ensuring the sufficient volume of the inlet layer 22 and achieving suitable PM collection performance. The upper limit of the thickness $T_A$ of the inlet layer 22 is not specifically limited and may be 100% or less, 95% or less, or 90% or less of the thickness T of the partition 16. A region where the inlet layer 22 is formed, as used herein, is referred to as the "inlet region", as described above. The "inlet region" includes a region where the outlet layer 24 to be described later and the inlet layer 22 overlap each other.

In the particulate filter 100 according to the present embodiment, the inlet layer 22 contains a precious metal catalyst. The precious metal catalyst is a catalyst material having a function of promoting combustion of PM and contains a precious metal, such as gold (Au), silver (Ag), palladium (Pd), rhodium (Rh), platinum (Pt), ruthenium (Ru), iridium (Ir), or osmium (Os). Among these precious metals, platinum group elements, such as Pt, Pd, and Rh, are particularly excellent in the action of promoting combustion of PM and are therefore particularly suitable as the precious metal contained in the inlet layer 22. The precious metal catalyst may contain a support that supports the precious metal in addition to the aforementioned precious metal. Examples of the material for the support include alumina ($Al_2O_3$), rare earth metal oxides, alkaline metal oxides, alkaline earth metal oxides, zirconia ($ZrO_2$), ceria ($CeO_2$), silica ($SiO_2$), magnesia (MgO), and titania ($TiO_2$).

By containing the above-described precious metal catalyst in the inlet layer 22, it is possible to promote combustion of PM deposited in the inlet region at and after the middle stage of operation. Therefore, clogging of the fine pores 18 of the partition 16 in the inlet region with PM is prevented in the particulate filter 100 according to the present embodiment, so that the gas flowability in the inlet region is maintained at a high level.

It is preferable that the content of the precious metal catalyst in the inlet layer 22 (a ratio of the content (g) of the precious metal catalyst to a volume of 1 L of the inlet layer 22) is 0.1 g/L or more. Thus, the gas flowability in the inlet region can be maintained at a higher level. The content of the precious metal catalyst in the inlet layer 22 is more preferably 0.5 g/L or more, further preferably 0.7 g/L or more, and particularly preferably 1 g/L or more from the viewpoint of maintaining the gas flowability in the inlet region at an even higher level. The upper limit of the content of the precious metal catalyst in the inlet layer 22 is not specifically limited and may be 20 g/L or less. From the viewpoint of easily forming the inlet layer 22, this upper limit is preferably 10 g/L or less, more preferably 7 g/L or less, further preferably 5 g/L or less, and particularly preferably 2 g/L or less.

Further, in the particulate filter 100 according to the present embodiment, the length of the inlet layer 22 (i.e., a length $L_A$ of the inlet region) in the extending direction of the partition 16 is set to 50% or more of the total length L of the partition 16 (assumed as being 100%). By ensuring the inlet layer 22 sufficiently in this manner, it is possible to ensure sufficient PM collection performance also in the inlet region where the precious metal catalyst is present. The length $L_A$ of the inlet region is preferably 55% or more and more preferably 60% or more of the total length L of the partition from the viewpoint of achieving more suitable PM collection performance. The upper limit of the length $L_A$ of the inlet region is set to 75% or less of the total length L in the present embodiment. This is because the extremely long inlet layer 22 excessively shortens a length $L_B$ of the outlet region where no precious metal catalyst is present and may cause deterioration of PM collection performance for exhaust gas during a high load operation. The upper limit of the length $L_A$ of the inlet region is preferably 70% or less of the total length L of the partition from the viewpoint of suitably ensuring the PM collection performance during the high load operation.

(2) Outlet Layer

The outlet layer 24 is a wash coat layer formed in a region near the gas outlet 14b including the partition 16. Specifically, the outlet layer 24 is formed to have a predetermined thickness $T_B$ from a surface of the partition 16 in contact with the outlet cell 14 toward the inner side of the partition 16 and to have a predetermined length along the extending direction of the partition 16 (the flow direction X of exhaust gas) from near the end on the exhaust gas outflow side X2. The thickness of the outlet layer 24 is preferably 50% or more, more preferably 60% or more, and further preferably 70% or more of the thickness T of the partition 16 from the viewpoint of improving the PM collection performance. The upper limit of the thickness $T_B$ of the outlet layer 24 is not specifically limited and may be 100% or less, 95% or less, 90% or less, or 85% or less of the thickness T of the partition 16. A region where only the outlet layer 24 is formed, as used herein, is referred to as the "outlet region", as described above.

In the particulate filter 100 according to the present embodiment, the outlet layer 24 contains substantially no precious metal catalyst (e.g., Au, Ag, Pd, Rh, Pt, Ru, Ir, and Os), unlike the inlet layer 22 described above. By forming the outlet layer 24 that contains substantially no precious metal catalyst, it is possible to reduce combustion of PM deposited in the outlet region. Therefore, the PM collection performance can be easily improved in association with the increase in the amount of deposited PM in the outlet region of the particulate filter 100 according to the present embodiment.

As used herein, the wording "contain(s) substantially no precious metal catalyst" means that a component interpreted as a precious metal catalyst is not added intentionally. Therefore, a case where a small amount of component that can be interpreted as a precious metal catalyst and originates from a material, a manufacturing process, or the like is contained and a case where a small amount of a precious metal catalyst has migrated from another catalyst layer to the outlet layer (e.g., a case where the precious metal catalyst has migrated from the inlet layer to the outlet layer), for example, are included in the concept "contain(s) substantially no precious metal catalyst" as used herein. For example, in the case where a ratio (g/L) of the content of the precious metal catalyst to the volume of the outlet layer 24 is 0.05 g/L or less (preferably 0.03 g/L or less, more preferably 0.01 g/L or less, further preferably 0.005 g/L or less, and particularly preferably 0.001 g/L or less), it can be said that the outlet layer 24 "contains substantially no precious metal catalyst".

(3) Relation Between Inlet Layer and Outlet Layer

The above-described particulate filter 100 according to the present embodiment can achieve both PM collection performance and pressure-drop reduction performance at high levels.

Specifically, exhaust gas G1 at the early stage of operation is likely to pass through the inlet region of the partition 16 due to its low flow rate, as illustrated in FIG. 3. The exhaust gas G1 at the early stage of operation contains a lot of PM and has a low temperature. Therefore, PM is hard to burn, and the PM collection performance can be easily improved by deposition of PM. It is thus possible to suitably collect PM even in the inlet region where the precious metal catalyst is present. At and after the middle stage of operation, exhaust gas with a low PM content is supplied at a high flow rate. However, a large increase in the pressure drop can be prevented because the temperature of the particulate filter 100 has risen sufficiently and the recovery of gas flowability by combustion of PM suitably occurs in the upstream-side region.

Exhaust gas G2 during a high load operation is likely to pass through the outlet region of the partition 16 due to its high flow rate. Since the exhaust gas G2 during the high load operation contains a lot of PM, the outlet region is required to have high PM collection performance. Meanwhile, the particulate filter 100 according to the present embodiment contains substantially no precious metal catalyst in the outlet region, and it is thus possible to improve PM collection performance in the outlet region beforehand before the high load operation is performed. Since the exhaust gas G2 during the high load operation has a relatively high temperature, deposited PM can be burned little by little even if there is no precious metal catalyst. Accordingly, a rapid increase in the pressure drop is less likely to occur even if exhaust gas with a high flow rate during the high load operation is supplied to the outlet region.

(5) Another Material

Another material can be added to the wash coat layer of the particulate filter disclosed herein, as long as that material does not spoil the essence of the present invention. Examples of the material that can be added to the wash coat layer include an OSC material (a material with oxygen storage capacity), a $NO_x$ adsorber, and a selective catalytic reduction (SCR) catalyst.

The OSC material is a material that stores therein oxygen when an oxygen concentration in exhaust gas is high (that is, an air-fuel ratio is lean), and discharges oxygen when the oxygen concentration in exhaust gas is low (that is, the air-fuel ratio is rich). Examples of the OSC material include a material containing cerium oxide (ceria: $CeO_2$) as a base. Examples of the material containing $CeO_2$ as a base include CZ based composite materials ($CeO_2$—$ZrO_2$ composite oxides). The CZ based composite material is a polycrystalline substance or a single crystal that mainly contains $CeO_2$ and $ZrO_2$. Various additional component(s) may be added to the CZ based composite material. Examples of the additional component include rare earth oxides, alkaline metal oxides, alkaline earth metal oxides, transition metals, alumina, and silica.

The OSC material has an action of maintaining exhaust gas passing through the partition 16 to be an oxidizing atmosphere and therefore can exhibit a function of promoting combustion of PM. It is thus preferable that the outlet layer 24 contains substantially no OSC material in the case where the OSC material is added to the wash coat layer 20. By this configuration, it is possible to achieve both pressure-drop reduction performance and PM collection performance at higher levels. As used herein, the wording "the outlet layer contains substantially no OSC material" also includes a case where the outlet layer contains a small amount of component interpreted as the OSC material and originating from a raw material, a manufacturing process, or the like. That is, in the case where a ratio (g/L) of the content of the OSC material to a volume of 1 L of the outlet layer 24 is 5 g/L or less (preferably 3 g/L or less, more preferably 2 g/L or less, further preferably 1 g/L or less, and particularly preferably 0.5 g/L or less), it can be said that "the outlet layer contains substantially no OSC material".

The $NO_x$ adsorber is a material that adsorbs $NO_x$ in exhaust gas when an air-fuel ratio of the exhaust gas is lean, i.e., oxygen is excessive, and discharges $NO_x$ when the air-fuel ratio becomes rich. A basic material containing one or more of metals that can donate electrons to $NO_x$ can be preferably used for the $NO_x$ adsorber. Examples of the basic material include alkaline metals, such as potassium (K), sodium (Na), and cesium (Cs), alkaline earth metals, such as barium (Ba) and calcium (Ca), rare earth elements, such as lanthanoid, and other metals, such as silver (Ag), copper (Cu), iron (Fe), and iridium (Ir). Among these examples, barium compounds (e.g., barium sulfate) are suitable because of high $NO_x$ adsorbing capacity.

It suffices that the SCR catalyst purifies nitrogen oxide ($NO_x$) in exhaust gas. The SCR catalyst is not specifically limited. Examples of the SCR catalyst include β zeolite and silicoaluminophosphate (SAPO) zeolite. Examples of SAPO include SAPO-5, SAPO-11, SAPO-14, SAPO-17, SAPO-18, SAPO-34, SAPO-39, SAPO-42, and SAPO-47. The SCR catalyst may contain any metal component. Examples of the metal component include copper (Cu), iron (Fe), sodium (Na), potassium (K), magnesium (Mg), calcium (Ca), cobalt (Co), nickel (Ni), zinc (Zn), silver (Ag), lead (Pb), vanadium (V), chromium (Cr), molybdenum (Mo), yttrium (Y), cerium (Ce), neodymium (Nd), tungsten (W), indium (In), and iridium (Ir). It is possible to purify $NO_x$ more efficiently by containing the above-described metal in the SAPO. In the case of containing the SCR catalyst in the wash coat layer 20, it is preferable to dispose a reducing agent supply means that supplies a reducing agent for generating ammonia (e.g., urea water), on the upstream side of the particulate filter (e.g., on the upstream side of the filter section 6 in FIG. 1).

C. Uses

The particulate filter 100 according to the present embodiment can be disposed in the exhaust passage of the internal combustion engine 2 as the filter section 6 that removes PM in exhaust gas, as described above (see FIG. 1). However, the particulate filter disclosed herein is not limited thereto and can be used for various purposes. For example, the particulate filter disclosed herein can serve as a three-way catalyst that purifies hydrocarbon (HC), carbon monoxide (CO), and nitrogen oxide ($NO_x$) because the filter contains a precious metal catalyst in the inlet layer thereof. Therefore, the particulate filter disclosed herein can also be used as an exhaust gas purifying catalyst that serves as both the catalyst section 5 and the filter section 6 in FIG. 1. In the case of using the particulate filter disclosed herein as a three-way catalyst, it is preferable that the OSC material and/or the $NO_x$ adsorber described above are/is added to the wash coat layer.

The particulate filter disclosed herein is particularly preferably used in the case where the internal combustion engine 2 is a gasoline engine of an automobile, although this description is not intended to limit the present invention. Exhaust gas emitted from the gasoline engine has a relatively high temperature, and therefore PM is less likely to be deposited inside fine pores of a partition. Meanwhile, the particulate filter disclosed herein contains substantially no precious metal catalyst in the outlet region, and it is thus possible to allow PM to be deposited in the outlet region in a suitable manner. Therefore, the particulate filter disclosed herein can suitably improve PM collection performance even when used in the gasoline engine.

The particulate filter disclosed herein is not limited to being used in the gasoline engine and can also be used for purifying exhaust gas from another engine (e.g., a diesel engine). In particular, in the case where an SCR catalyst is added to the wash coat layer and a reducing agent supply means is disposed on the upstream side of the particulate filter as described above, the particulate filter can serve as both an SCR device that purifies $NO_x$ contained in the exhaust gas from the diesel engine and a filter section that removes PM.

D. Manufacturing of Particulate Filter

An example of a method of manufacturing the particulate filter 100 according to the present embodiment will be described below. The particulate filter disclosed herein is not limited to a particulate filter manufactured by the following manufacturing method.

The particulate filter 100 according to the present embodiment can be manufactured, for example, by preparing a slurry containing materials for the wash coat layer 20 and introducing the slurry into the fine pores 18 of the partition 16 of the substrate 10. Each process will be described below.

(1) Slurry Preparation

In this process, a slurry is prepared by dispersing the above-described materials for the wash coat layer 20 in a predetermined dispersion medium. Various dispersion media that can be used for preparation this type of slurry are usable without any limitation. For example, the dispersion medium may be a polar solvent (e.g., water) or a nonpolar solvent (e.g., methanol). The slurry may contain an organic component for viscosity adjustment in addition to the above-described material for the wash coat layer 20 and the dispersion medium. Examples of the organic component for viscosity adjustment include cellulose polymers, such as carboxymethyl cellulose (CMC), methyl cellulose (MC), hydroxypropyl methyl cellulose (HPMC), and hydroxyethyl methyl cellulose (HEMC).

In fabrication of the particulate filter 100 according to the present embodiment, two kinds of slurries are prepared which include a slurry for the inlet layer containing a precious metal catalyst and a slurry for the outlet layer that contains substantially no precious metal catalyst. A detailed description regarding the precious metal catalyst is omitted because it overlaps the above description. The slurry for the inlet layer and the slurry for the outlet layer may be different from each other in a material other than the precious metal catalyst. For example, it is possible to make the viscosity of the slurry for the inlet layer and that of the slurry for the outlet layer different from each other by making the addition amount and/or the type of the organic component for viscosity adjustment different. It is thus possible to easily adjust a region where each of the inlet layer and the outlet layer is formed.

(2) Introduction of Slurry

In this process, the wash coat layer 20 is formed by introducing the above-described slurries into the fine pores 18 of the partition 16. A means that introduces the slurries into the fine pores 18 is not specifically limited. A conventionally known means can be used without any limitation. Examples of the slurry introducing means include air blowing and suction coating. In the case of using air blowing, an end of the substrate 10 is immersed in the slurry, causing the slurry to penetrate into the cells 12 and 14. Thereafter, the substrate 10 is taken out, and air blowing is performed. The slurry is thus introduced into the fine pores 18. In the case of using suction coating, while an end of the substrate 10 is immersed in the slurry, the slurry is sucked from the other end thereof. The slurry is thus introduced into the fine pores 18.

The particulate filter 100 according to the present embodiment is provided with the wash coat layer 20 including the inlet layer 22 and the outlet layer 24. In formation of the wash coat layer 20 using suction coating, the slurry is sucked through the gas outlet 14b of the substrate 10 while the gas inlet 12a is immersed in the slurry for the inlet layer. By this process, the slurry for the inlet layer is applied from near the end on the exhaust gas inflow side X1 to have a predetermined length and a predetermined thickness. The thus applied slurry is dried and fired, so that the inlet layer 22 is formed. Next, the slurry is sucked through the gas inlet 12a of the substrate 10 while the gas outlet 14b is immersed in the slurry for the outlet layer. By this process, the slurry for the outlet layer is applied from near the end on the exhaust gas outflow side X2 to have a predetermined length and a predetermined thickness. The thus applied slurry is dried and fired, so that the outlet layer 24 is formed. In this formation, it is possible to control the region where each slurry is to be applied by adjusting the viscosity of the slurry and/or the suction power of the suction coating device. Accordingly, a portion of the inlet layer 22 and a portion of the outlet layer 24 after firing can be made to overlap each other, and the length of the inlet layer 22 to the total length L of the partition 16 can be controlled to be 50% or more and 75% or less.

The order of forming the inlet layer 22 and the outlet layer 24 is not specifically limited. The inlet layer 22 may be formed after the outlet layer 24 is formed. By sucking the slurry for the inlet layer having the appropriately set viscosity with appropriate suction power, it is easy to make distribution of the thickness $T_A$ of the inlet layer 22 in the flow direction X of exhaust gas uniform, and it is possible to make fine pores in the inlet region small and reduce variation in the pore diameters (that is, make distribution of pore diameters sharp). Further, in the above-described method, the inlet layer 22 is formed by drying and firing the slurry for the inlet layer and thereafter the slurry for the outlet layer is introduced into the substrate. However, after drying the slurry for the inlet layer, the slurry for the outlet layer may be introduced and both the slurries for the inlet layer and for the outlet layer may be fired at the same time. Also in this case, it is possible to form the wash coat layer 20 including the inlet layer 22 and the outlet layer 24.

Air blowing may be carried out after introduction of the slurry and before drying of the slurry. This makes it possible to prevent the slurry from remaining in the cells 12 and 14, which can suppress the formation of the wash coat layer on the surface 16a of the partition 16 (see FIG. 5) in contact with the cells 12 and 14.

In the particulate filter 100 manufactured in this manner, the inlet layer 22 contains a precious metal catalyst, and the outlet layer 24 contains substantially no precious metal catalyst. The length $L_A$ of the inlet layer 22 with respect to the total length L of the partition 16 is limited to 50% or more and 75% or less. As described above, the particulate filter 100 having this configuration can achieve both PM collection performance and pressure-drop reduction performance at high levels as a whole.

TEST EXAMPLES

Test examples concerning the present invention are described below. The following description, however, is not intended to limit the present invention to the test examples. In the test examples, a plurality of particulate filters different from each other in a region containing a precious metal catalyst inside a partition were fabricated. For the particulate filters, evaluation was performed with regard to PM collection performance and pressure-drop reduction performance.

1. Sample Preparation (1) Sample 1

Alumina powder, barium oxide powder, and ion-exchange water were mixed to prepare a Pd-free slurry. While immersing a gas inlet of a wall-flow filter substrate (made of cordierite and having a length of 152.4 mm and the total capacity of cells of 1.7 L) in the Pd-free slurry, this slurry was sucked through a gas outlet by using a suction coating device, thus introducing the Pd-free slurry to an upstream region of a partition in the substrate such that it has a predetermined length and a predetermined thickness. Then, the slurry was dried and fired to form an inlet layer. Next, the slurry was also sucked through the gas inlet while immersing the gas outlet in the Pd-free slurry, thus introducing the Pd-free slurry to a downstream region of the partition such that it has a predetermined length and a predetermined thickness. Then, the slurry was also dried and fired to form an outlet layer. The "lengths $L_A$ and $L_B$", the "coating amount (amount of introduced slurry)", and the "Pd content" are shown in Table 1 for each of an inlet region and an exist-side region.

(2) Sample 2

In this sample, a Pd-containing slurry was prepared which had the same components as the Pd-free slurry of Sample 1 except that the Pd-containing slurry contained a palladium nitrate solution (a precursor of a precious metal catalyst). That is, the palladium nitrate solution, alumina powder, barium oxide powder, and ion-exchange water were mixed to prepare the Pd-containing slurry. The Pd-containing slurry was then introduced to both the upstream region and the downstream region of the partition, followed by drying and firing of the slurry introduced in each region. As a result, a particulate filter containing a precious metal catalyst (Pd) in both the inlet layer and the outlet layer was fabricated. Other conditions were set to be the same as those in Sample 1.

(3) Sample 3

In this sample, the above-described Pd-containing slurry was introduced to the upstream region of the partition to form the inlet layer containing the precious metal catalyst (Pd), and the Pd-free slurry was introduced to the downstream region of the partition to form the outlet layer containing no precious metal catalyst. In addition, suction power of the suction coating device was adjusted to make the length of the inlet layer (the length $L_A$ of the inlet region) with respect to the total length L of the partition equal to 40%. Other conditions were set to be the same as those in Sample 1.

(4) Samples 4 to 7

In Samples 4 to 7, suction power of the suction coating device was made stronger than in Sample 3 to make the length of the inlet layer (the length $L_A$ of the inlet region) with respect to the total length L of the partition longer than that in Sample 3. Specifically, the length $L_A$ of the inlet region in Sample 4 was set to 50% of the total length L of the partition. The length $L_A$ of the inlet region in Sample 5 was set to 60% of the total length L of the partition. The length $L_A$ of the inlet region in Sample 6 was set to 75% of the total length L of the partition. The length $L_A$ of the inlet region in Sample 7 was set to 80% of the total length L of the partition. Other conditions were the same as those in Sample 3.

2. Evaluation Test (1) PM Collection Performance

In this evaluation, a PM collection efficiency was measured for each sample, whereby PM collection performance was evaluated. Specifically, the particulate filter of each of Samples 1 to 7 was installed in an exhaust passage of a vehicle (with a 2 liter gasoline engine). The vehicle was operated in Phase 4 mode in WLTP (Worldwide harmonized Light duty driving Test Procedure). Then, PM emissions X when the particulate filter was installed and PM emissions Y when the particulate filter was removed were measured. The PM collection efficiency was calculated based on the following equation. Results are shown in Table 1.

PM collection efficiency (%)=[(Y–X)/Y]×100

TABLE 1

| | Inlet region | | | Outlet region | | | PM collection efficiency |
|---|---|---|---|---|---|---|---|
| | Length $L_A$ (%) | Coating amount (g/L) | Pd content (g/L) | Length $L_B$ (%) | Coating amount (g/L) | Pd content (g/L) | |
| Sample 1 | 60 | 50 | — | 40 | 50 | — | 93.9 |
| Sample 2 | 60 | 50 | 0.15 | 40 | 50 | 0.15 | 81.8 |
| Sample 3 | 40 | 50 | 0.15 | 60 | 50 | — | 77.9 |
| Sample 4 | 50 | 50 | 0.15 | 50 | 50 | — | 82.8 |
| Sample 5 | 60 | 50 | 0.15 | 40 | 50 | — | 85.1 |
| Sample 6 | 75 | 50 | 0.15 | 25 | 50 | — | 89.7 |
| Sample 7 | 80 | 50 | 0.15 | 20 | 50 | — | 78.3 |

As illustrated in Table 1, the results show that the PM collection efficiency was the highest in Sample 1 and was lowered in Samples 2 to 7 from Sample 1. It has also been revealed that PM collection performance tends to be reduced by addition of a precious metal catalyst (Pd) to the wash coat layer, although the degree of reduction is different.

Further, it has been confirmed that Samples 4 to 6 in which the length $L_A$ of the inlet region with respect to the total length L of the partition was set to 50% or more and 75% or less can exhibit a higher level of PM collection performance than Sample 2 in which the precious metal catalyst was contained in both the inlet layer and the outlet layer.

(2) Pressure-Drop Reduction Performance

Regeneration treatment was performed on the particulate filters of Samples 1, 2, and 5, and changes in the pressure drop and the weight of deposited PM in the regeneration treatment were measured. Specifically, the particulate filter in which PM had been deposited during the above-described measurement of PM collection efficiency was attached to an engine bench and was subjected to the regeneration treatment. In the regeneration treatment, high-temperature exhaust gas (having a temperature of 500° C. and an air-fuel ratio of 14.7) was supplied for 60 minutes. A pressure drop (kPa) and the weight of deposited PM (g) were measured immediately after (0 minutes after), 30 minutes after, and 60 minutes after the start of the regeneration treatment. Results are shown in Table 2.

TABLE 2

|  | Pressure drop (kPa) | | | Weight of deposited PM (g) | | |
| --- | --- | --- | --- | --- | --- | --- |
|  | 0 min | 30 min | 60 min | 0 min | 30 min | 60 min |
| Sample 1 | 19.0 | 18.8 | 18.7 | 4.4 | 4.4 | 4.6 |
| Sample 2 | 17.4 | 11.1 | 8.0 | 4.4 | 0.6 | 0.3 |
| Sample 5 | 18.3 | 15.2 | 9.8 | 4.7 | 1.7 | 0.5 |

As illustrated in Table 2, in Sample 1 in which Pd was not contained in the wash coat layer, the weight of the deposited PM was not reduced, and the pressure drop was almost not recovered even by the regeneration treatment. Meanwhile, in Samples 2 and 5 in which Pd was contained in the wash coat layer, the weight of the deposited PM was reduced over time, and the pressure drop was recovered to approximately the same level 60 minutes after the start of the regeneration treatment. It has also been revealed that, even if PM collection performance is slightly reduced, it is necessary to contain a precious metal catalyst, such as Pd, in the wash coat layer, considering the pressure-drop reduction performance. When Samples 2 and 5 are compared with each other in consideration of the above-described results regarding PM collection performance, it is found that when a precious metal catalyst is contained in the inlet layer and is not contained in the outlet layer as in Sample 5, both PM collection performance and pressure-drop reduction performance can be achieved at high levels.

INDUSTRIAL APPLICABILITY

According to the present invention, it is possible to provide a particulate filter capable of achieving both PM collection performance and pressure-drop reduction performance at high levels.

The invention claimed is:

1. A particulate filter suitable for collecting particulate matter in exhaust gas emitted from an internal combustion engine, the particulate filter being disposed in an exhaust passage of the internal combustion engine, the particulate filter comprising:
    a wall-flow structure substrate including
        an inlet cell open only at an exhaust gas inflow end,
        an outlet cell adjacent to the inlet cell and open only at an exhaust gas outflow end, and
        a porous partition that partitions the inlet cell and the outlet cell; and
    a wash coat layer formed inside the partition, wherein the wash coat layer includes:
    an inlet layer having a predetermined thickness from a surface of the partition in contact with the inlet cell toward an inner side of the partition and having a predetermined length along an extending direction of the partition from near the exhaust gas inflow end; and
    an outlet layer having a predetermined thickness from a surface of the partition in contact with the outlet cell toward the inner side of the partition and having a predetermined length along the extending direction of the partition from near the exhaust gas outflow end,
    the thicknesses and the lengths of the inlet layer and the outlet layer are set such that the inlet layer and the outlet layer partially overlap each other,
    the inlet layer contains a precious metal catalyst that promotes combustion of the particulate matter, while the outlet layer contains substantially no precious metal catalyst, and
    assuming that a total length of the partition in the extending direction is 100%, the inlet layer exists in a region of 50% or more and 75% or less from near the exhaust gas inflow end.

2. The particulate filter according to claim 1, wherein, assuming that the total length of the partition in the extending direction is 100%, the inlet layer exists in a region of 60% or more from near the exhaust gas outflow end.

3. The particulate filter according to claim 1, wherein a content of the precious metal catalyst in the inlet layer is 0.1 g/L or more.

4. The particulate filter according to claim 1, wherein, assuming that a thickness of the partition is 100%, the inlet layer has a thickness of 60% or more and 100% or less from the surface in contact with the inlet cell toward the inner side of the partition.

5. The particulate filter according to claim 1, wherein, assuming that a thickness of the partition is 100%, the outlet layer has a thickness of 60% or more and 100% or less from the surface in contact with the outlet cell toward the inner side of the partition.

6. The particulate filter according to claim 1, wherein the precious metal catalyst contains at least one platinum group element selected from a group consisting of Pt, Pd, and Rh.

7. The particulate filter according to claim 1, wherein the internal combustion engine is a gasoline engine.

8. The particulate filter according to claim 2, wherein a content of the precious metal catalyst in the inlet layer is 0.1 g/L or more.

9. The particulate filter according to claim 2, wherein, assuming that a thickness of the partition is 100%, the inlet layer has a thickness of 60% or more and 100% or less from the surface in contact with the inlet cell toward the inner side of the partition.

10. The particulate filter according to claim 2, wherein, assuming that a thickness of the partition is 100%, the outlet layer has a thickness of 60% or more and 100% or less from the surface in contact with the outlet cell toward the inner side of the partition.

11. The particulate filter according to claim 2, wherein the precious metal catalyst contains at least one platinum group element selected from a group consisting of Pt, Pd, and Rh.

12. The particulate filter according to claim 2, wherein the internal combustion engine is a gasoline engine.

13. The particulate filter according to claim 3, wherein, assuming that a thickness of the partition is 100%, the inlet layer has a thickness of 60% or more and 100% or less from the surface in contact with the inlet cell toward the inner side of the partition.

14. The particulate filter according to claim 3, wherein, assuming that a thickness of the partition is 100%, the outlet layer has a thickness of 60% or more and 100% or less from the surface in contact with the outlet cell toward the inner side of the partition.

15. The particulate filter according to claim 3, wherein the precious metal catalyst contains at least one platinum group element selected from a group consisting of Pt, Pd, and Rh.

16. The particulate filter according to claim 3, wherein the internal combustion engine is a gasoline engine.

17. The particulate filter according to claim 4, wherein, assuming that a thickness of the partition is 100%, the outlet layer has a thickness of 60% or more and 100% or less from the surface in contact with the outlet cell toward the inner side of the partition.

18. The particulate filter according to claim 4, wherein the precious metal catalyst contains at least one platinum group element selected from a group consisting of Pt, Pd, and Rh.

19. The particulate filter according to claim 4, wherein the internal combustion engine is a gasoline engine.

* * * * *